Patented Feb. 22, 1949

2,462,267

UNITED STATES PATENT OFFICE 2,462,267

ORGANO-SILOXANE POLYMERS AND METHODS OF PREPARING THEM

James Franklin Hyde, Corning, N. Y., assignor to Corning Glass Works, Corning, N. Y., a corporation of New York No Drawing. Original application February 26, 1942, Serial No. 432,528. Divided and this application April 17, 1943, Serial No. 483,449

3 Claims. (Cl. 260—448.2)

This application is a division of my co-pending application Serial Number 432,528 filed February 26, 1942 and also a continuation-in-part of my co-pending applications, Serial Number 318,373, filed February 10, 1940, and Serial Number 353,302, filed August 19, 1940. Application Serial No. 318,373 is now Patent No. 2,386,466 and application Serial No. 353,302 is now Patent No. 2,371,050.

The hydrolysis of a mono-silane of the type $SiX_4$, where X is any hydrolyzable atom or group, such as halogen, alkoxy, hydrogen, amino, etc., does not result in a simple hydroxy compound but produces instead a brittle, insoluble, infusible gel comprising a three-dimensional network of structural units composed of siloxane linkages as a result of the concurrent or subsequent loss of water from the intermediately formed hydroxy compound,

*Type I*

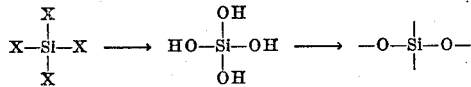

The formation of a siloxane linkage requires the close approach of two hydroxyl groups. It is apparent that, in the formation of such a rigid structure, many hydroxyl groups become isolated and block some of the possible cross linkages. As the structural network becomes more complicated, dehydration becomes increasingly more difficult and the result is a partially dehydrated silica gel of poor dimensional stability.

Organo-substituted silanes of the type $RSiX_3$ are prepared by means of the well-known Grignard reaction, where R may be any organic radical which is capable of reacting with magnesium to form a Grignard reagent and which is attached to silicon through a carbon atom. Such organo-substituted silanes are also hydrolyzed on treatment with water, although the reaction is less vigorous than in the case of the unsubstituted silanes under comparable conditions. Here, also concurrent dehydration or condensation with splitting out of water may occur so that a partially dehydrated product may result which can further be dehydrated by heat.

*Type II*

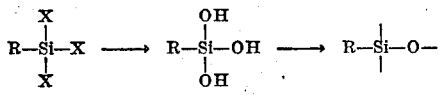

Here it will be seen that in each structural unit one of the four silicon bonds is blocked by the organic radical R, and only three siloxane linkages can form. Such compounds are still capable of three-dimensional polymerization.

The chemical and structural changes occurring in this type of substituted silane are the same as those described above in the formation of silica gel. The chief distinction arises from the fact that the property of solubility in organic solvents, particularly in the lower stages of condensation, is acquired due to the presence of the organic radical. The tendency of intermediate partially dehydrated products to further dehydrate is also decreased. The latter tendency is more noticeable with increasing size of the radical. As the stage of essentially complete dehydration is approached, the mono-substituted products, which in reality are substituted silica gels, lose their solubility and become hard and brittle. However, there is a marked improvement in dimensional stability over silica gel.

On substituting a second organic radical which is attached to silicon through a carbon atom and which may or may not be different from the first, a silane of the type $RR'SiX_2$ results. Such compounds also may be hydrolyzed and dehydrated, the dehydration probably proceeding to some extent concurrently with the hydrolysis, particularly if the temperature is allowed to rise.

*Type III*

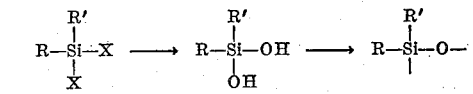

In each structural unit two of the four silicon bonds are now blocked by the organic radicals R and R', and only two siloxane linkages are possible. Hence a three-dimensional network is no longer possible and the resulting polymers can comprise only chain and cyclic structures. Intermediate crystalline dihydroxy compounds can in some instances be isolated. The final products which are usually resinous in character bear little physical resemblance to silica gel but are closely related thereto in chemical structure, differing only in the restriction of possible siloxane linkages.

Organo-substituted silanes of the type $RR'R''SiX$ when hydrolyzed and dehydrated, yield very simple oxides in the structural unit of which three of the four silicon bonds are blocked by the organic radicals R, R' and R''.

*Type IV*

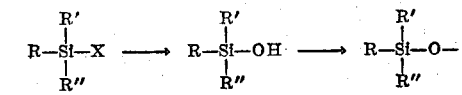

In this case, ease of hydrolysis is further diminished and in some cases the intermediate hydroxy silanes can be isolated. The completely dehydrated product is dimeric because only one siloxane linkage can be formed. The dimers are either crystalline or liquid.

Prior attempts to utilize the above described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible gel of little utility; Type IV reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object is to combine the above described reactions and thus to inter-condense the hydrolysis products of a plurality of substituted and unsubstituted organo-silanes.

Another object is to provide a method of preparing an organo-siloxane containing as one of its essential constituents the recurring structural unit

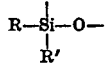

where R and R' represent the same or different organic radicals with carbon-silicon linkage.

A further object is to prepare new compositions of matter comprising organo-siloxanes containing as one of their essential constituents the recurring structural unit

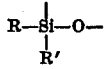

where R and R' represent the same or different organic radicals with carbon-silicon linkage.

Another object is to produce liquid products of varying viscosity.

Another object is to produce thermoplastic resinous products.

Another object is to produce thermosetting resinous products.

My new method comprises mixing a compound of the type $R_2SiX_2$ with one or more different compounds of the types $RSiX_3$, $R_2SiX_2$ and $R_3SiX$, where each R is an organic radical attached to silicon through a carbon atom and each X is a hydrolyzable atom or group, hydrolyzing the mixture and inter-condensing the hydrolysis products. If compounds of two different types are inter-condensed, then the organic radicals may be the same or different, but if compounds of the same type are inter-condensed then they must have different substituents. This inter-condensation is best accomplished by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

In any hydrolyzable mixture of silanes, one or more of which is organo-substituted through C-Si linkage and contains from one to three hydrolyzable atoms or groups attached to the silicon atom, cohydrolysis and dehydration by this method will result in formation of interconnecting oxygen linkages between the silicon atoms of the various silanes. The variety of the substituted organic radicals is limited only by their ability to form a Grignard reagent. In other words, the organo-silanes which may be employed in my process include all such compounds which contain one or more hydrolyzable atoms or groups and which may be prepared by means of the well-known Grignard reaction. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di- and triethyl phenyls, mono-, di- and tripropyl phenyls, etc.; naphthyl, mono- and tripropyl naphthyl, etc.; tetra-hydro-naphthyl; anthracyl, etc.; aralkyl such as benzyl, phenylethyl, etc.; alkenyl such as methallyl, allyl, etc.

If the hydrolyzable group or groups of all of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above described method, the slow incorporation of water into the homogeneous solution insures that hydrolysis is not permitted to proceed unchecked, whereby the more reactive silane or silanes, that is, silanes containing few or no substituted organic radicals per silicon atom, would be more completely hydrolyzed and condensed before the less reactive or more highly substituted silanes have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate intermolecular combination through siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The partially dehydrated organo-siloxanes or hydrolysis products, after removal of solvents, are generally liquids of various viscosities and they vary in the extent to which dehydration has occurred at this stage. The ease of dehydration and the physical properties of the completely condensed organo-siloxanes vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio decreases. When this ratio is less than one, the organo-siloxanes are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, particularly on the mono-substituted silicon atoms, the viscosity increases to such an extent that the organo-siloxane is a thermoplastic solid which may be fused and solidified repeatedly by heating and cooling. As the oxygen to silicon ratio is increased to the neighborhood of 1.5 and beyond (approaching 2), the organo-siloxanes tend to become thermosetting and more particularly if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enables one to predict the most suitable combination of intermediate compounds for the production of an organo-siloxane for the desired purpose.

The following examples will illustrate the mode of operation of the process and the character of the resulting products. In the examples abbreviations are used to designate certain radicals and groups thus: methyl (Me); ethyl (Et); ethoxy (OEt); phenyl ($\phi$).

Example 1

$Me_2C_6H_3Si(OEt)_3$, $Me_2Si(OEt)_2$ and $\phi Me_2SiOEt$ were mixed in equi-molecular proportions and diluted with dioxane. 4% aqueous HCl mixed with dioxane was added dropwise. The solution was concentrated under reduced pressure leaving a viscous oil.

Example 2

Equi-molecular proportions of $\phi MgCl$, $EtMgCl$ and $SiCl_4$ in ether solution were slowly mixed and maintained at 20°–30° C. until the reaction was completed. The ether was then distilled off leaving a mixture of mono-, di- and tri-substituted silicon chlorides. This was diluted with 2 volumes of dioxane and treated with moist air. Evaporation on the hot plate gave a viscous liquid which gelled quite rapidly to a rubbery mass, which was quite tough and hard after three hours.

Example 3

Equal molar proportions of $MeSi(OEt)_3$, $\phi EtSiCl_2$ and $\phi Me_2SiOEt$ were mixed and dissolved in an equal volume of dioxane. The compounds were hydrolyzed by dropwise addition of a solution of water and dioxane in the volumetric proportions of 1/2. The solvent and excess water were subsequently removed by evaporation at room temperature under reduced pressure. The resulting copolymer was a liquid of low viscosity. It did not solidify when heated on a glass plate for 1½ hours at 190° C.

As has been pointed out it is possible to predict the general properties of the organo-siloxanes on the basis of the oxygen/silicon ratio and the secondary effect of the size of the organic radicals. However, in all organo-silicon compounds the thermal stability of the carbon-silicon linkage varies with the kind of radical. It is necessary to take this into account when considering uses for copolymers. In general there is a decrease in thermal stability with increase in size of aliphatic radicals. The compositions containing allyl, methallyl, benzyl and $\beta$-phenylethyl radicals are relatively less stable than compositions containing such radicals as phenyl, methyl, ethyl, etc. Therefore certain temperature limitations are encountered in their uses.

It will be seen that the organo-siloxanes produced by my method are not mixtures of individual polymers but are new compounds differing therefrom in homogeneity of structure and properties. It will further be seen that the new polymers may contain various different radicals attached to the same silicon atom and the individual silicon atoms may differ in the number and kind of radicals attached thereto in which respect the new polymers differ from previous organo-silicon polymers where each silicon atom was attached to the same kind of radicals. Such differences result in new compounds or copolymers which embody various improvements over previous polymers with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes in temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen-silicon ratio usually greater than 1.0 are useful as molding compounds, film forming coatings, varnishes, impregnating agents for electrical insulation and the like. They may be applied as solutions of the incompletely condensed copolymers and after evaporation of the solvent can be further polymerized in situ. The more brittle products should be useful embedding media for condenser plates as well as molding compounds. Such products usually have an oxygen-silicon ratio of 1.5 or greater and may be thermoset in situ by heat.

I claim:

1. The method of preparing new synthetic compositions which comprises mixing substantially equimolar proportions of methyltriethoxysilane, phenylethylsilicon dichloride and phenyldimethylethoxysilane, dissolving said mixture in an approximately equal volume of dioxan, hydrolyzing said mixture by the dropwise addition of a solution of water and dioxan in the volumetric proportions of 1 to 2, removing the solvent and excess water, and recovering the organo-silicon product.

2. The method which comprises mixing substantially equimolar proportions of methyltriethoxysilane, phenylethylsilicon dichloride and phenyldimethylethoxysilane, hydrolyzing said mixture, dehydrating the hydrolysis product, and recovering the organo-siloxane thereby produced.

3. A copolymeric organosiloxane comprising copolymeric units which contain substantially entirely oxygen atoms, organo-silicon units which correspond to the general formulae $(CH_3)Si\equiv$, $(C_6H_5)(C_2H_5)Si=$, and $(C_6H_5)(CH_3)_2Si-$, respectively, said units being present in substantially equimolecular amounts, said organo-silicon units being the only silicon units present in said organosiloxane and being joined to each other by said oxygen atoms by silicon-oxygen linkages, the remaining valences of the silicon atoms being satisfied by said silicon-oxygen linkages.

JAMES FRANKLIN HYDE.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,220 | Rochow | Oct. 7, 1941 |
| 2,258,222 | Rochow | Oct. 7, 1941 |
| 2,386,466 | Hyde | Oct. 9, 1945 |
| 2,435,147 | McGregor et al. | Jan. 27, 1948 |

OTHER REFERENCES

Cusa et al.: J. Chem. Soc. (London), 1932, pp. 2205 to 2209.

Meads et al.: J. Chem. Soc. (London), 1914, pp. 679 to 690.

Dilthey: Berichte Deut. Chem. Gesel., 1904, vol. 37, part 1, pages 1139 to 1142. (Copy in Sci. Lib.).

Kipping: T. J. Chem. Soc. (London), Vol. 101, 1912, pages 2108 to 2114.

Robison: Journ. Chem. Soc. (London), vol. 101, 1912, pp. 2156 to 2158.

Koton: J. Applied Chem. USSR, vol. 12, pages 1435 to 1439 (1939); Chemical Abstracts, pages 6242 to 6243 (1941). Copy in Div. 6.

Beilstein: Handbuch der Organ. Chem., vol XVI, pages 910, 1933. Copy in Div. 6.